Patented Aug. 6, 1946

2,405,249

UNITED STATES PATENT OFFICE 2,405,249

METHOD OF APPLYING COATING FILMS

Mitchell Wilson, New York, N. Y., assignor to Fred'k H. Levey Co., Inc., New York, N. Y., a corporation of New York Application November 13, 1943, Serial No. 510,154

6 Claims. (Cl. 117—93)

This invention relates to the application of coating films, and particularly to the elimination of solvents from such films by exposing them to the effect of an alternating electrostatic field.

In general, coating compositions and vehicles therefor may consist of a resin dissolved in a suitable solvent. Such coating compositions and vehicles with or without pigments or other coloring agents are usually applied as films to supporting surfaces. Frequently they are dried by the application of heat to evaporate the solvent.

Various materials including some of the resins generate heat within themselves when subjected to an alternating electrostatic field and such materials are called polar because of the existence of dipole moments in each molecule. The word "polar" is used hereinafter in the same sense as employed by Debye in "Polar molecules" and refers to a physical property which is known as the dipole moment of the material. The value of the dipole moment for each polar substance can be measured with great accuracy. The literature lists hundreds of recorded dipole moment observations.

Because the measurement of the dipole moment is a complicated procedure it is convenient to adopt an inferential measure of this quantity on the basis of information and data supplied by many manufacturers consisting of the dielectric constants of their products. If the dielectric constant is 3 or less, no useful dipole moment may be said to exist for the purpose of the present invention. When the dielectric constant is above 3 the material is polar in the sense that this term is used herein.

Due to the induced molecular motion of polar molecules in an alternating electrostatic field a proportion of the electrostatic energy is converted to heat energy within the polar material. This conversion is called dielectric loss because from the point of view of power operation it is undesirable. On the other hand, it is the purpose of this invention to utilize the dielectric loss in the materials used in order to attain the desired object.

When an electrostatic field is of uniform strength throughout the region occupied by the material, the latter will be heated uniformly. The amount of heat resulting from the conversion of electrical energy depends upon the dipole moment of the body, its physical state, and the applied frequency of the field. For a solution of a given resin and definite applied frequency, there is a relatively small range of viscosities within which the dielectric loss attains a maximum. In drying compositions consisting of resinous materials dissolved in volatile solvents, the solution becomes thicker and more viscous as the solvent evaporates. The amount of heat developed by dielectric loss diminishes as the viscosity increases beyond the limits of the above-mentioned range. Hence, drying which, for example, may be rapid in the initial stage of the treatment may be relatively slow after a part of the solvent has been removed. Accordingly, the heating of a vehicle consisting of a single resin body in a solvent by the application of an alternating electrostatic field of definite frequency diminishes and may cease with solvent removal.

Heretofore this problem has been attacked by using electrostatic fields of multiple frequencies. This obviously requires the use of involved apparatus. To avoid this difficulty it has been suggested that powdered metals may be incorporated in the vehicle. The attempt to use finely divided metals in this manner introduces other difficulties which make the suggestion undesirable in practice.

It is the object of the present invention to provide a method of applying coating films, including the drying thereof, by the application of an alternating electrostatic field and to avoid the difficulties hereinbefore mentioned by maintaining a uniform heating effect as the solvent is progressively eliminated.

Another object of the invention is the application thereof to printing whereby printed impressions on sheets or webs may be dried satisfactorily and rapidly by the application of the high frequency electrostatic field.

Other objects and advantages of the invention will be better understood by reference to the following specification and the accompanying drawings, in which.

Polar resins may be divided generally into two classes in respect to the effect of a high frequency field thereon. One class includes the resins which produce maximum dielectric loss in an alternating electrostatic field when dissolved in a suitable solvent to form a solution of low viscosity comparable to the viscosity of a coating composition before it is applied as a film. The other class includes those resins which act similarly when dissolved to form solutions of high viscosity comparable to the condition of the coating composition as it approaches a dry condition. The former are designated for the purpose of the invention "low viscosity resins" and the latter "high viscosity resins."

I have discovered that by combining selected resins of each class in suitable solvents it is possible to provide desirable vehicles for inks, protective and similar coating and adhesive compositions. Because of the inclusion of resins of both classes, the range of viscosities in which the maximum dielectric loss is obtained in an alternating electrostatic field is greatly extended. Thus a film of the vehicle at its lowest viscosity will be heated rapidly because of the presence of the low viscosity resinous component and the solvent will evaporate. As the viscosity increases due to elimination of the solvent the dielectric loss of another resinous component incorporated in the same mixture and having its maximum dielectric loss in the higher viscosity range develops. Consequently a maximum dielectric loss is obtained substantially throughout the drying period and rapid and complete drying is accomplished with the maximum conversion of energy. Two or more components may be combined to permit the rapid drying of a film without change in the frequency of the field or the addition of extraneous electrolytes or other non-resinous bodies designed to increase the heating effect.

The resins which are suitable for the purpose of the present invention are numerous, and a complete catalog thereof is unnecessary. Those mentioned hereinafter are typical examples of materials which may be used. However, there are numerous possible substitutes, the characteristics of which may be determined readily so as to permit classification thereof as low viscosity or high viscosity polar resins for the purpose of the present invention.

Figure 1:
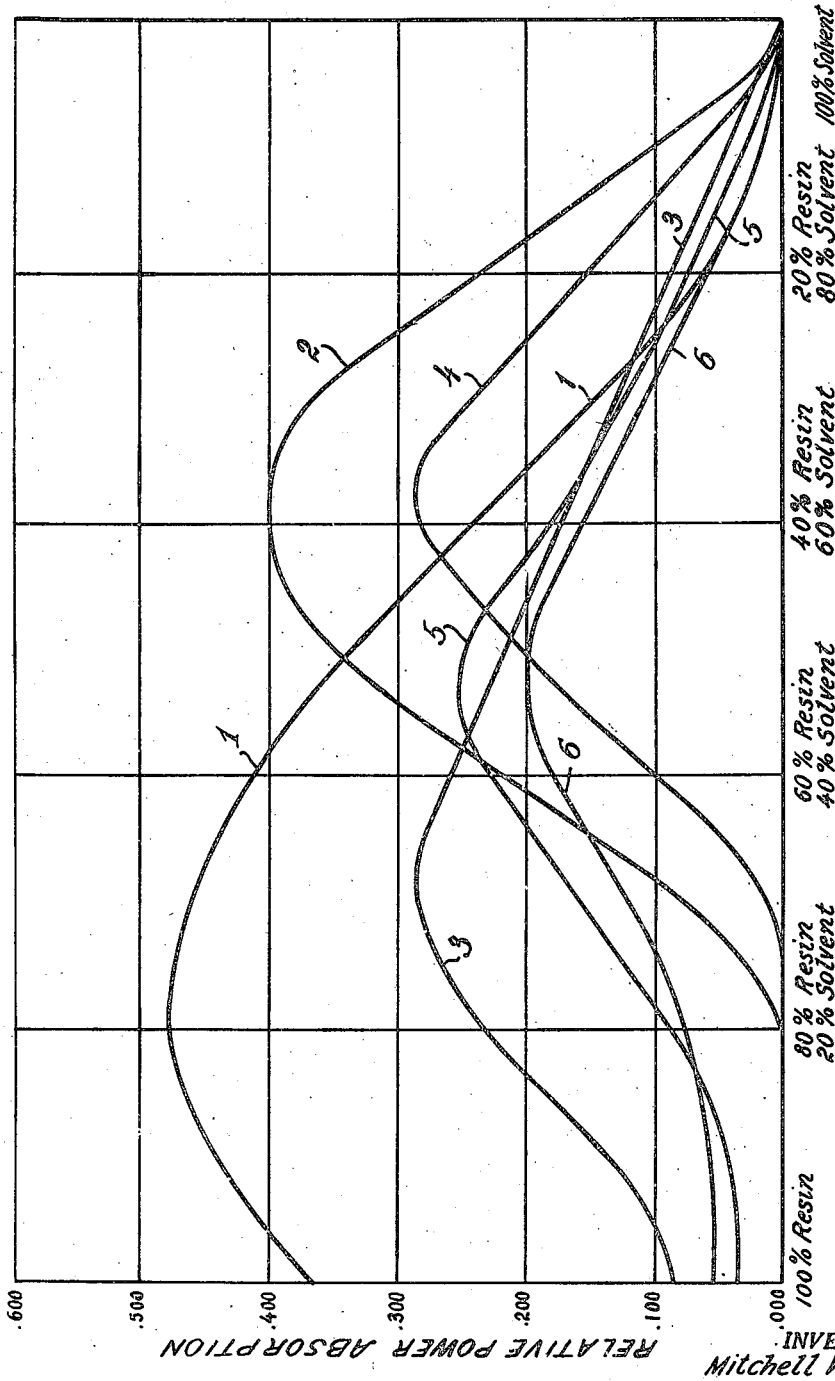
Fig. 1 is a graph illustrating the heating and the dielectric loss characteristics of various resins.

Referring to Fig. 1 of the drawings, the relative power conversion which corresponds to the heating effect is indicated by curves 1 to 6 inclusive over a range of viscosities indicated by the relative percentage of resin and solvent. The identity of the particular resins and the corresponding curves is as follows:

1. Petrex—Terpenine maleic anhydride.
2. Alvar 7/70—Polyvinyl acetate acetal.
3. Petrex 5—Terpenine maleic anhydride.
4. Alvar 15/70—Polyvinyl acetate acetal.
5. Amberol #800 P.—Rosin derivative of maleic acid and glycerine.
6. Staybelite ester gum—Hydrogenated rosin ester.

The solvent employed in obtaining the data was terpineol. As is evident from Fig. 1, resins 1 and 3 are high viscosity resins, resins 2 and 4 are low viscosity resins, and resins 5 and 6 are intermediate.

While terpineol, having a low dipole moment, is a desirable solvent for the preparation of resinous compositions of the character described, other suitable solvents may be used. For example, a petroleum distillate having a boiling point range and vapor pressures within the range required may be utilized in preparing compositions, including suitable resins, for the purposes of the invention. Likewise, solvents which have a high dipole moment—that is to say are capable of producing heat in an alternating electrostatic field—may be used likewise in producing the desired compositions. An example of such a solvent is acetonyl acetone. Other similar solvents are available. In general, it is desirable that any solvent used shall have vapor pressure characteristics preventing evaporation at ordinary room temperatures but permitting rapid evaporation with relatively slight increase in temperature. Terpineol, as already indicated, is a typical solvent of this type.

Figure 2:
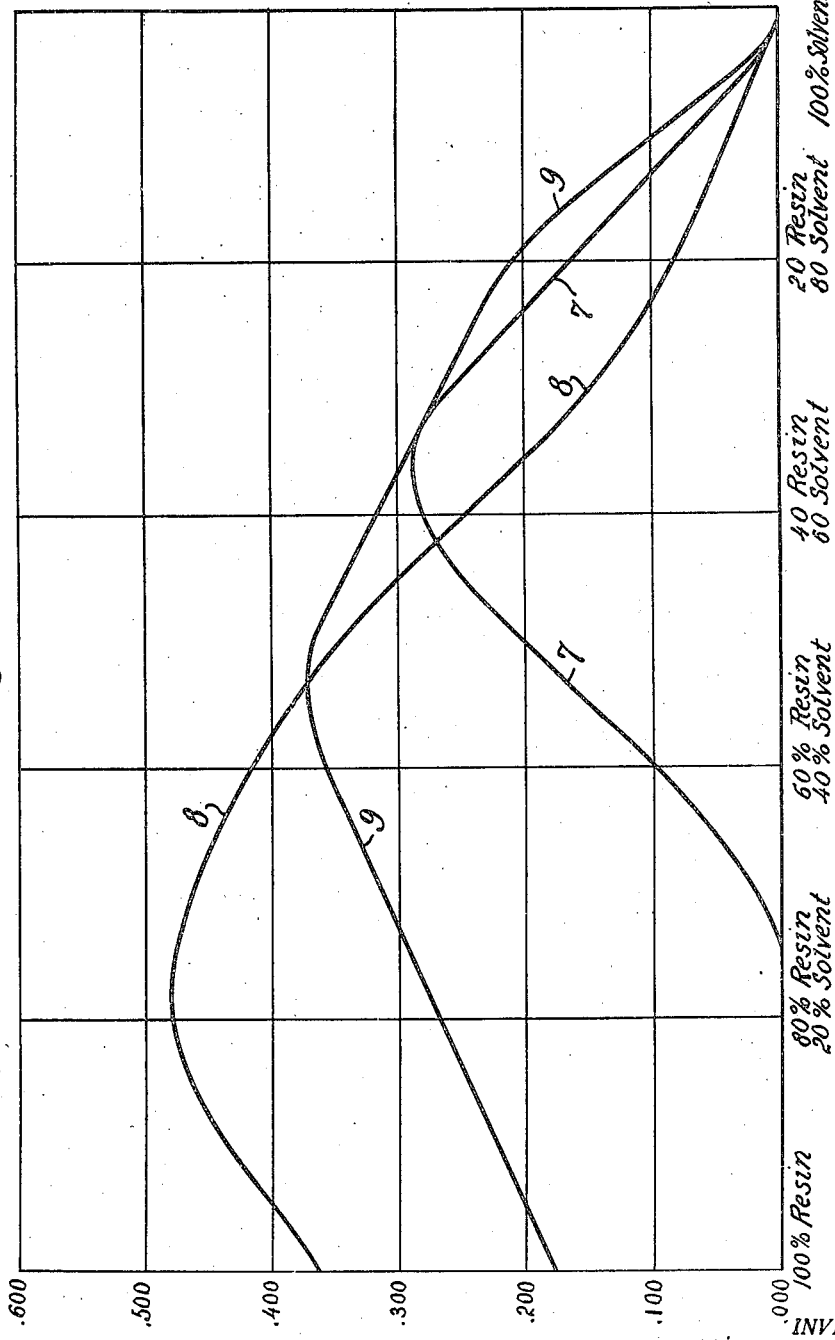
Fig. 2 is a graph illustrating the advantages attained by combining two resins having different characteristics in a single composition.

As an example of the invention, Fig. 2 illustrates the heating characteristics of two resins belonging respectively to the low and high viscosity classes. Curve 7 of Fig. 2 illustrates the heating effect of Alvar 15/70, and curve 8 illustrates the similar characteristics of Petrex. When the two resins are combined in terpineol, curve 9 represents the characteristics of the resulting composition. As will be readily seen from this example, the maximum heating effect is distributed so that drying of a film can be accomplished over a wide range of viscosities, whereas the use of a single resin involves maximum heating either in the low voscosity or the high viscosity field.

Figure 3:
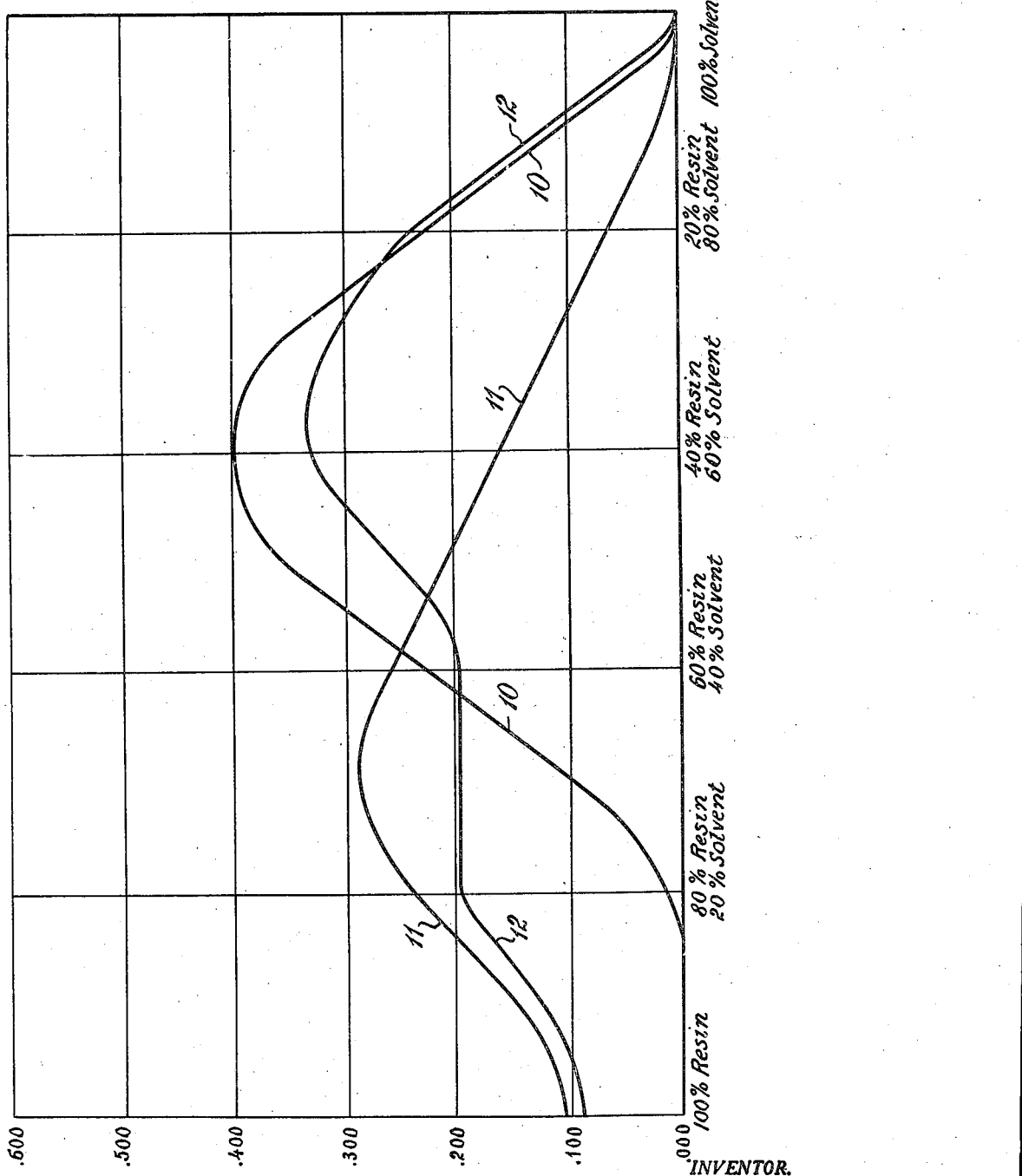
Fig. 3 is a graph similarly illustrating the application of the invention employing different resins.

Similarly in Fig. 3, curve 10 illustrates the characteristics of Alvar 7/70, and curve 11 represents the characteristics of Petrex 5. Curve 12 shows the characteristics of a composition in which the two resins are combined in terpineol, and as is evident the heating effect is spread over a wider range of viscosities so that drying of the film may be accomplished readily.

In both of the foregoing examples, the two resins employed in the composition were used in equal proportions. The proportions may be varied over wide ranges to accomplish the purpose of the invention. There are no critical proportions. The amount of solvent employed will depend upon the desired viscosity of the vehicle for the particular use to which it is applied. Thus, vehicles employed for coating are usually less viscous than those used in printing inks. Any desired degree of initial viscosity may be attained by selecting suitable resins and varying the amount of solvent employed.

An additional example of the invention is presented in the following formulation:

| | Parts |
|---|---|
| Petrex resin 5 HT | 38.2 |
| Amberol #800 P | 33.3 |
| Acetonyl Acetone | 28.4 |

This composition illustrates the use of a solvent having a fairly high dipole moment.

Films of the several vehicles hereinbefore described, when drawn down on paper and placed immediately in an electric field oscillating at a frequency of 3.2 megacycles at an intensity of 10,000 volts/cm., dry in less than a second, giving a surface which is solid, non-sticky and non-rubbing.

To apply the invention in the formulation of printing inks, I may employ a vehicle including the following components:

| | Per cent |
|---|---|
| Terpineol | 66.60 |
| Petrex-5 | 27.50 |
| Alvar 7/70 | 5.9 |

This is merely a typical example which is subject to wide variation in the selection of suitable resins and solvents.

Three inks prepared with the vehicle described may have the following compositions:

Black

| | Per cent |
|---|---|
| Black pigment | 14.68 |
| Terpineol | 57.77 |
| Alvar 7/70 | 4.88 |
| Petrex 5 | 22.67 |
| | 100.00 |

Yellow

| | |
|---|---|
| Chrome Yellow | 49.33 |
| Petrex 5 | 13.55 |
| Alvar 7/70 | 2.91 |
| Terpineol | 34.21 |
| | 100.00 |

Red

| | |
|---|---|
| Eosin Red | 24.73 |
| Terpineol | 50.18 |
| Alvar 7/70 | 4.44 |
| Petrex 5 | 20.65 |
| | 100.00 |

The drying times were measured by making drawdowns in the usual fashion and subjecting them immediately to the action of the field. The field was parallel to the plane of the film surface and had an intensity of 10,000 volts/cm. at a frequency of 3.2 megacycles. All of the samples dried in less than a second.

In the manufacture of inks embodying the invention, it is sometimes desirable to employ a wetting agent such as dehydrogenated castor oil to facilitate distribution of the ink on the inking rollers. For this particular wetting agent, on a combination of rubber and steel rollers, from .10% to .65% of the whole was required depending on the pigment employed. Other wetting agents, of which a variety is available, can be utilized if necessary and in different proportions. The necessity for employing a wetting agent will vary with the composition and also with the character of the inking rollers employed.

While I have described the invention particularly in reference to the composition of printing inks, it is to be understood that vehicles for paints, enamels, lacquers and other coating and protective compositions, with or without coloring agents, may be prepared in accordance with the invention as described. Selection of suitable resins and solvents and the initial viscosities of the compositions will, as hereinbefore indicated, depend upon the particular use for which the material is intended. All such vehicles may be dried rapidly by the application of the alternating electrostatic field of high frequency to generate heat within the vehicle for the purpose of evaporating the solvent.

The invention has numerous advantages. Drying is accomplished at temperatures which need not be appreciably higher than the boiling point of the solvent employed. Nuisances resulting from oxidation of the solvent at high temperature are avoided. Likewise, overheating of the supporting surface and possible damage thereto are eliminated. The film is heated uniformly, and evaporation occurs at a substantially constant rate, thus ensuring greater efficiency.

By the application of the invention as described, it is possible to secure rapid and complete drying by subjecting the film to a field at a single frequency, thereby simplifying the electrical system. Moreover, it is unnecessary to add extraneous electrolytes or metals to the composition in order to improve the heat generation of the vehicle.

This application is a continuation-in-part of my application, Serial No. 464,625, filed November 5, 1942.

Various changes may be made in the compositions and the components and proportions thereof without departing from the invention or sacrificing any of the advantages thereof.

I claim:

1. The method of drying a film of a coating composition comprising a solution in a solvent of two polar resins having dielectric constants greater than 3, which comprises establishing an electrostatic field by connecting a pair of spaced electrodes to a source of single-frequency alternating current and vaporizing the solvent from the film by subjecting it to said electrostatic field, one of said resins having its maximum dielectric loss at the selected frequency when the coating composition has a low viscosity and contains the major portion of the solvent and the other of said resins having its maximum dielectric loss at the selected frequency when said solution has a high viscosity approaching dryness whereby a substantially continuous heating effect is maintained during vaporization of the solvent.

2. The method as claimed in claim 1, in which a high frequency alternating current is used to establish the electrostatic field.

3. The method as claimed in claim 1, in which the solvent for the polar resins is a polar solvent.

4. In the method of applying a liquid coating composition as a film to a supporting surface, the steps which comprise incorporating into said coating composition two polar resins soluble therein and having dielectric constants greater than 3, establishing an electrostatic field by connecting a pair of spaced electrodes to a source of single-frequency alternating current, one of said resins having its maximum dielectric loss at the selected frequency when the coating composition has a low viscosity and contains the major portion of the solvent and the other of said resins having its maximum dielectric loss at the selected frequency when the coating composition has a high viscosity approaching dryness, proportioning the amounts of the two resins to maintain a substantially continuous heating effect during subsequent vaporization of the solvent, depositing the coating composition in a film on a supporting surface, and vaporizing the solvent from the film by subjecting it to said electrostatic field.

5. In the method as claimed in claim 4, the use of a high frequency alternating current to establish the electrostatic field.

6. In the method as claimed in claim 4, the use of a polar solvent in the coating composition.

MITCHELL WILSON.